Figure 1:
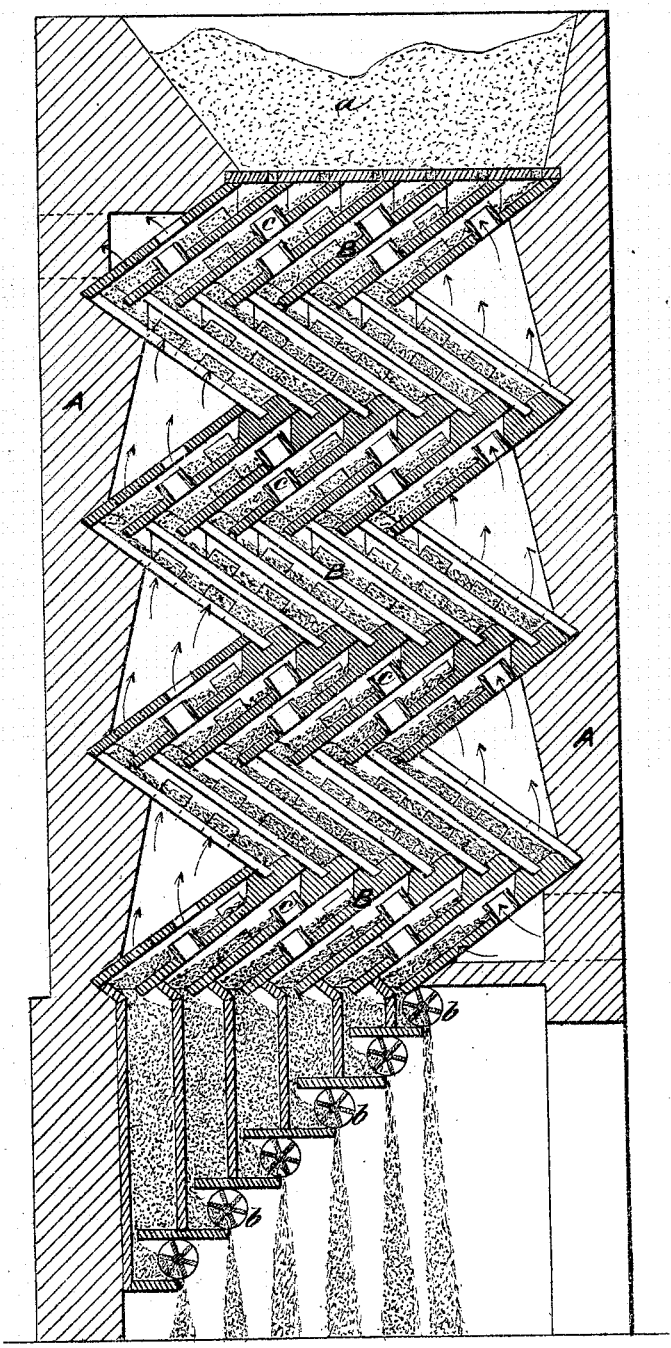

HENRY DEACON.
Improvement in the Manufacture of Bleaching Powder, Sulphates, etc.
No. 121,595. Patented Dec. 5, 1871.

UNITED STATES PATENT OFFICE.

HENRY DEACON, OF APPLETON HOUSE, WIDNES, ENGLAND.

IMPROVEMENT IN THE MANUFACTURE OF BLEACHING-POWDERS, SULPHATES, &C.

Specification forming part of Letters Patent No. 121,595, dated December 5, 1871.

*To all whom it may concern:*

Be it known that I, HENRY DEACON, of Appleton House, Widnes, in the county of Lancaster, England, alkali manufacturer, have invented Improvements in the Manufacture of Bleaching-Powder and of Sulphate of Soda, and in Apparatus to be employed therein, of which the following is a specification:

My invention consists in the conducting the manufacture of bleaching-powder and of sulphate of soda and of sulphate of potash in an apparatus consisting of a vertical chamber containing a number or series of inclined shelves (perforated or not) disposed alternately at such angles as will cause or permit the solid materials to be operated upon to fall or pass over them by reason of their gravity, when permitted so to do, the fall or passage over such shelves being regulated or arrested by a valve-slide or regulator placed at the inferior portion of the lower half of the chamber.

The materials to be operated upon are to be supplied or fed, by means of a hopper or other feeding arrangement, into the upper portion of the chamber; and the gases to be absorbed are admitted at or near the lower portion of the chamber, and those gaseous products which are not absorbed or are produced are allowed to pass off at the upper portion of the chamber after passing over the various surfaces exposed on the inclined shelves.

When dry-slaked lime is the solid substance and the gas is dry chlorine, either pure or mixed with inert and dry gases, the process will be carried on at a low temperature, and the solid product obtained will be bleaching-powder or chloride of lime.

Instead of using gases containing chlorine, and instead of the solid substances employed being dry-slaked lime, and instead of working at a low temperature, if the same kind of apparatus be constructed of bricks or other suitable refractory materials and be used at high temperature, either with common salt (chloride of sodium) or with chloride of potassium, both in pieces, as the solid material, and a mixture of suphurous-acid gas, air, and vapor of water, in such proportions as to contain one equivalent of sulphurous acid, one of oxygen, and one of water, be employed instead of gases containing chlorine, then the solid product obtained will be the sulphate corresponding to the chloride used, and the gaseous product will contain hydrochloric acid, which may be condensed in the ordinary manner.

And in order that my said invention may be fully understood I shall now proceed more particularly to describe the same, and for that purpose shall refer to the figures on the annexed drawing, the same letters of reference indicating corresponding parts in both the figures.

Figure 2:
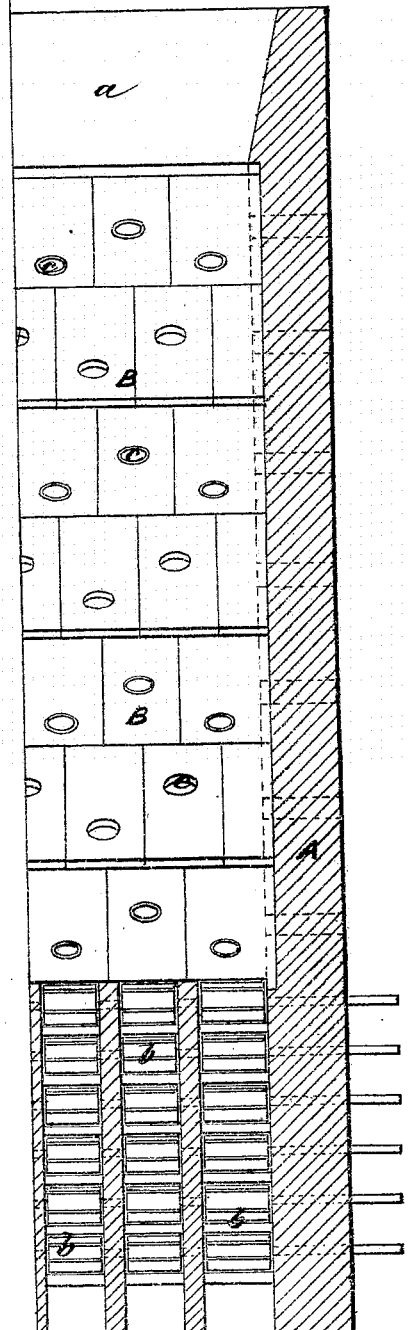

Figure 1 represents a sectional elevation of the apparatus which may be employed in working my invention. Fig. 2 is a half-front elevation at right angles, corresponding to Fig. 1, and having the front wall removed.

A A are chambers, filled with distinct series of inclined shelves B B, and with a hopper, $a$, at the top to hold the raw materials, and slowly-rotating fluted rollers or regulators $b\ b$ at the bottom to regulate the motion of the raw materials through the apparatus and through each series of shelves. The shelves are set at an angle slightly more vertical than the outside angle the raw materials would assume if carefully piled in a ridge or long heap; usually about one-fifth of a semicircle or an angle of thirty-six degrees is convenient.

The raw materials should be in small pieces or in powder, dry and not coherent, the chlorides being dried first, if necessary, and, by preference, used warm to avoid condensation thereon of vapor of water, and the lime slaked without excess of water, but, of course, used as cold as practicable.

On placing the materials in the hopper $a$ the raw materials pass through the slots or holes at the bottom thereof, and run down the inclined shelves in succession until stopped by the fluted rollers or regulators $b\ b$. The heap then accumulates, resting upon the lowest shelf first, the outside of the heap or layer assuming the natural angle and increasing in thickness and height until it obstructs the hole or slit at the top of the first shelf, and so on with each shelf in succession until the flow of more raw materials from the hopper is similarly prevented. The layers will then be nearly as represented in section in Fig. 1. On rotating a regulator, $b$, some of the material is withdrawn; this is immediately replaced by that immediately above it, and so on through the shelves in that series; and the whole mass of each set of connected shelves being nearly in equilibrium, each movement of each regulator $b$, removing some material, occasions a nearly-simultaneous movement throughout its connected shelves, ending with the admission of as much raw material from the hopper $a$ as is withdrawn by the regulator $b$, the same total weight of material on the shelves being thus kept practically constant, and the supply of raw material being regulated by the withdrawal of the material which has been acted upon. The regulator $b$ may be moved by any convenient mechanical power, and either separately or together; if separately, there is more control over the process.

The intervals between the shelves are not filled up by the materials; but the materials leave a space open, as indicated in the drawing, which space forms the passage for the chemical gases, *videlicet*, the heated sulphurous-acid gas, air, (oxygen,) and steam where making the sulphate of soda or sulphate of potash from their chlorides; or of dry chlorine (by preference diluted with inert dry gases) when making bleaching-powder by its absorption by slaked lime. The efficiency of this apparatus, *ceteris paribus*, will greatly depend upon this space between the shelves being as narrow as possible. Of course it must have sufficient sectional area to allow of the passage of the current of gases; but it should be as nearly parallel to the surface of the materials to be acted upon, and also as narrow, as is practically possible. I prefer, also, to have the materials in thin rather than in thick layers. The gases enter at the bottom, and may pass horizontally and alternately lengthwise along each shelf, one after another, in the same horizontal series, supposing there to be no perforations in such shelves; they then rise up and return in a similar but reverse manner through the next horizontal series above; and so on through each horizontal series in succession until they reach the outlet at the top.

In Figs. 1 and 2 a different mode of passing the gases is shown. A number of openings, $c\ c$, is made through the shelves, each opening being surrounded by a ledge or raised edge to prevent the solid materials from passing through; and the openings are not opposite to each other, but are so arranged that the gases first pass in a zig-zag direction through the lowest horizontal series of shelves; then rise to the second horizontal series, traversing it in a contrary but still zigzag direction; and so to the outlet at the top, zigzaging through each horizontal series in succession.

The first-described method of passing the gas is better adapted to the manufacture of bleaching-powder, while that indicated in the drawing is better adapted to the manufacture of sulphates. Holes opening into the spaces between the shelves are made opposite each end of the shelves for inspection or the introduction of tools to remove accidental obstructions. These holes are opened and closed at pleasure.

When making bleaching-powder the gases and apparatus will be kept throughout as cool as possible, and for this purpose it is not necessary to construct the apparatus of heat-resisting materials. Combinations of bricks, slates, and iron will be obviously convenient. For making sulphate of soda and sulphate of potash the apparatus must be able to resist more or less heat. A heat closely approaching to redness, but not reaching it, will suffice. The gases should be fully heated, in any convenient manner, before admission to the apparatus; and the apparatus itself may have flues surrounding it to maintain or impart heat. Combinations of brick and iron work will at once occur to practical men as wherewith to construct efficient apparatus for this purpose.

The apparatus as described being provided, the manufacture proceeds as follows: Taking, first, the manufacture of bleaching-powder, the lime is prepared as usual, excepting that special care is taken that it is dry, for if the lime or bleaching-powder is damp it will not pass freely down the shelves. It is placed in the hopper $a$ and quickly distributes itself over the shelves B B. The chlorine (obtained in any well-known manner, but, by preference, diluted with inert gases) is then, if necessary, dried in any suitable manner, (by preference in the manner described in the specification of Letters Patent for the United States of America granted to me and bearing date the twenty-second August, one thousand eight hundred and seventy-one, No. 118,212,) and is passed through the apparatus. The regulators $b$ are set in motion, slowly at first, and subsequently at a rate that is found to deliver the bleaching-powder made as quickly as it has absorbed enough chlorine, the first portions that pass through the apparatus being set aside or returned to the hopper for being again passed through the apparatus, if found to contain too little chlorine. Secondly, when making sulphates the apparatus, constructed to withstand the action of the heat, is either heated by its external flues or by passing heated gases through it. The chloride corresponding to the sulphate required, quite dry and in small pieces or in powder, is placed in the hopper $a$. A heated mixture of sulphurous-acid gas, air, (oxygen,) and vapor of water, obtained and heated in any well-known manner, is then passed through the apparatus, and the regulators $b$ are rotated and the manufacture proceeded with similarly as described for bleaching-powder, but, of course, at a comparatively high temperature. The well-known reaction ensues, the alkaline sulphate corresponding to the chloride is formed and is withdrawn by the regulators $b$, and the hydrochloric-acid gas and the uncondensible and unused gases pass away by the outlet. From these gases the hydrochloric acid may be condensed or absorbed by water in the usual way before entering the aspirating apparatus, or may be otherwise utilized; as, for example, by being directly decomposed into chlorine, as is well understood. At least one equivalent of each of the gases is necessary; but an excess of air and vapor of water above the equivalent proportions, although they require more fuel to heat and more power to move, increase the rapidity of the reaction. About two equivalents of air (oxygen) and two of vapor of water to one of sulphurous-acid gas may be used with safety. Care must be taken to keep the heat below the fusing-point of the solid materials. Cast-iron can be very freely used in the construction of the apparatus if the temperature be kept nearly reaching, but not attaining to, visible redness.

The apparatus and methods of manufacture herein described may be varied in many ways without altering the efficiency of the manufacture; and I do not, therefore, confine myself to the details herein described; neither do I claim the manufacture of bleaching-powder by the use of inclined shelves or surfaces, either when the lime is made to fall or pass over them by moving or shaking them, or when the lime is not retained or its motion is not regulated nor arrested on such inclined shelves while it is absorbing chlorine.

I have hereinbefore described the manufacture of sulphate of soda and of potash from their respective chlorides when such chlorides are unmixed with the other substances; but these chlorides may be mixed with raw or burnt pyrites when such burnt or raw pyrites contain a material amount of copper, silver, &c.—the same conversion of the chlorides into their corresponding sulphates will take place, the sulphur of the raw pyrites and that, if any, contained in the burned pyrites assisting in such conversion, and the copper and silver will at the same time be rendered soluble. The various substances thus obtained in a state of mixture may afterward be separated and utilized in any well-known manner.

I claim as my invention—

The employment, in the manufacture of bleaching-powder and of sulphate of soda and of sulphate of potash, of inclined shelves, with spaces left above or between the said shelves, through which spaces the chemical gases pass and act on the solid materials during their passage over and along such inclined shelves, as hereinbefore described, and illustrated by the drawing.

In testimony whereof I have signed my name to this specification in the presence of two subscribing witnesses.

HENRY DEACON.

Witnesses:
   FRED. WALKDEN,
   JNO. POTTER,
*Clerks to Mr. I. H. Johnson,*
   *47 Lincoln's Inn Fields, London.* (11)